US012379932B2

(12) United States Patent
Shen et al.

(10) Patent No.: US 12,379,932 B2
(45) Date of Patent: Aug. 5, 2025

(54) EXECUTION OF INSTRUCTIONS REQUIRING ACCESS TO AN ARRAY REGISTER

(71) Applicant: Arm Limited, Cambridge (GB)

(72) Inventors: Xiaoyang Shen, Valbonne (FR); Shun Wan, Cambridge (GB); Zichao Xie, Cambourne (GB); Scott Ryan Tancock, Haverhill (GB)

(73) Assignee: Arm Limited, Cambridge (GB)

( * ) Notice: Subject to any disclaimer, the term of this patent is extended or adjusted under 35 U.S.C. 154(b) by 33 days.

(21) Appl. No.: 18/393,833

(22) Filed: Dec. 22, 2023

(65) Prior Publication Data

US 2025/0208876 A1 Jun. 26, 2025

(51) Int. Cl.
*G06F 9/38* (2018.01)
*G06F 9/30* (2018.01)

(52) U.S. Cl.
CPC ........ *G06F 9/3836* (2013.01); *G06F 9/30098* (2013.01)

(58) Field of Classification Search
CPC ........................... G06F 9/3836; G06F 9/30098
See application file for complete search history.

(56) References Cited

U.S. PATENT DOCUMENTS 5,555,384 A * 9/1996 Roberts .............. G06F 9/30014 712/216
5,809,275 A * 9/1998 Lesartre ................ G06F 9/3856 712/216
6,868,491 B1 * 3/2005 Moore .................. G06F 9/3889 712/216
7,178,008 B2 * 2/2007 Hironaka ............. G06F 9/3885 712/E9.071
7,774,582 B2 * 8/2010 Williamson .......... G06F 9/3836 712/216
9,081,581 B2 * 7/2015 Hardage ............... G06F 9/3016
10,114,650 B2 10/2018 Kenney et al.

(Continued)

FOREIGN PATENT DOCUMENTS

WO WO-2018138467 A1 * 8/2018 .......... G06F 11/0721

OTHER PUBLICATIONS

Combined Search and Examination Report for GB Application No. 2403115.5 dated Jan. 21, 2025, 8 pages.

*Primary Examiner* — Farley Abad
(74) *Attorney, Agent, or Firm* — NIXON & VANDERHYE P.C.

(57) ABSTRACT

There is provided an apparatus, a system, a chip containing product, a method, and a medium. The apparatus comprises: a plurality of registers comprising at least one array register having a plurality of array regions. The apparatus comprises processing circuitry to receive issued instructions and to process those instructions. The apparatus is also provided with control circuitry responsive to receipt of an instruction requiring access to two or more array regions: to decompose the instruction into two or more execution parts, each corresponding to one of the two or more array regions; and for each execution part, to delay issuing the execution part until it is predicted that the execution part can be processed hazard free. The control circuitry is capable of issuing the two or more execution parts in different cycles based on when it is predicted that each execution part can be processed hazard free.

20 Claims, 11 Drawing Sheets

Receive instruction specifying two or more regions in the array register — S70

Decompose the instruction into two or more execution parts, each of the execution parts corresponding to a region of the array register — S72

Store instruction in buffer circuitry and set delay counters to delay issuing execution parts until it is predicted that the execution part can be processed hazard free — S74

(56) References Cited

U.S. PATENT DOCUMENTS

| | | | | |
|---|---|---|---|---|
| 2006/0271768 | A1* | 11/2006 | Williamson | G06F 9/3828<br>712/E9.046 |
| 2008/0288759 | A1* | 11/2008 | Gonion | G06F 9/30038<br>712/235 |
| 2011/0153986 | A1* | 6/2011 | Alexander | G06F 9/3826<br>712/225 |
| 2014/0281408 | A1* | 9/2014 | Zeng | G06F 9/3834<br>712/216 |
| 2020/0278865 | A1* | 9/2020 | Langhammer | G06F 9/30098 |
| 2021/0294607 | A1* | 9/2021 | Abhishek Raja | G06F 9/30043 |

* cited by examiner

Cycle n

Per region delay

| | 1 | 0 |
|---|---|---|
| 0 | 0 | 2 |
| 1 | 1 | 1 |

26

Instructions queued in control unit

| Instruction | Location | Delay | # cycles |
|---|---|---|---|
| Instr_F | (X0,2,Y2,2) | -2 | 4 |
| Instr_G | (X0,4,Y1,1) | 1 | 2 |
| Instr_H | (X0,4,Y0,1) | 4 | 2 |
| | | | |

22

Region 0,0 tracked executing instructions

| | X3 | X2 | X1 | X0 |
|---|---|---|---|---|
| Y0 | 4 | 4 | 4 | 4 |
| Y1 | 1 | 1 | 1 | 1 |
| Y2 | -2 | -2 | -2 | -2 |
| Y3 | -5 | -5 | -2 | -2 |

Cycle n+1

Per region delay

| | 1 | 0 |
|---|---|---|
| 0 | 0 | 2 |
| 1 | 1 | 1 |

26

Instructions queued in control unit

| Instruction | Location | Delay | # cycles |
|---|---|---|---|
| Instr_G | (X0,4,Y1,1) | 0 | 2 |
| Instr_H | (X0,4,Y0,1) | 3 | 2 |
| | | | |
| | | | |

22

Region 0,0 tracked executing instructions

| | X3 | X2 | X1 | X0 |
|---|---|---|---|---|
| Y0 | 3 | 3 | 3 | 3 |
| Y1 | 0 | 0 | 0 | 0 |
| Y2 | -3 | -3 | 1 | 1 |
| Y3 | -6 | -6 | 1 | 1 |

Per region delay

| | 1 | 0 |
|---|---|---|
| 0 | 0 | 2 |
| 1 | 1 | 1 |

26

Instructions queued in control unit

| Instruction | Location | Delay | # cycles |
|---|---|---|---|
| Instr_G | (X0,4,Y1,1) | -1 | 2 |
| Instr_H | (X0,4,Y0,1) | 2 | 2 |
| Instr_I | (X0,4,Y1,1) | 1 | 4 |
| | | | |

22

Region 0,0 tracked executing instructions

| | X3 | X2 | X1 | X0 |
|---|---|---|---|---|
| Y0 | 2 | 2 | 2 | 2 |
| Y1 | -1 | -1 | -1 | -1 |
| Y2 | -3 | -3 | 0 | 0 |
| Y3 | -6 | -6 | 0 | 0 |

EXECUTION OF INSTRUCTIONS REQUIRING ACCESS TO AN ARRAY REGISTER

TECHNICAL FIELD

The present invention relates to data processing. Furthermore, the present invention relates to an apparatus, a system, a chip containing product, a method, and a non-transitory computer readable storage medium.

BACKGROUND

Some apparatuses are provided with a plurality of registers including an array register.

SUMMARY

According to a first aspect of the present techniques there is provided an apparatus comprising:

- a plurality of registers configured to store data, the plurality of registers comprising at least one array register comprising a plurality of array regions;
- processing circuitry configured to receive issued instructions and to perform processing operations identified in the issued instructions; and
- control circuitry comprising buffer circuitry to store one or more instructions prior to execution by the processing circuitry, the control circuitry responsive to receipt of an instruction requiring access to two or more array regions of the plurality of array regions:
  - to decompose the instruction into two or more execution parts, each of the two or more execution parts corresponding to one of the two or more array regions; and
  - for each execution part of the two or more execution parts, to delay issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

According to a second aspect of the present techniques there is provided a system comprising:

- the apparatus of the first aspect, implemented in at least one packaged chip;
- at least one system component; and
- a board,
- wherein the at least one packaged chip and the at least one system component are assembled on the board.

According to a third aspect of the present techniques there is provided a chip-containing product comprising the system of the second aspect assembled on a further board with at least one other product component.

According to a fourth aspect of the present techniques there is provided a method comprising:

- storing data in a plurality of registers, the plurality of registers comprising at least one array register comprising a plurality of array regions;
- with processing circuitry, receiving issued instructions and performing processing operations identified in the issued instructions;
- storing one or more instructions in buffer circuitry prior to execution by the processing circuitry; and
- with control circuitry, in response to receipt of an instruction requiring access to two or more array regions of the plurality of array regions:
  - decomposing the instruction into two or more execution parts, each of the two or more execution parts corresponding to one of the two or more array regions;
  - for each execution part of the two or more execution parts, delaying issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

According to a further aspect of the present techniques there is provided a non-transitory computer-readable medium to store computer-readable code for fabrication of an apparatus comprising:

- a plurality of registers configured to store data, the plurality of registers comprising at least one array register comprising a plurality of array regions;
- processing circuitry configured to receive issued instructions and to perform processing operations identified in the issued instructions; and
- control circuitry comprising buffer circuitry to store one or more instructions prior to execution by the processing circuitry, the control circuitry responsive to receipt of an instruction requiring access to two or more array regions of the plurality of array regions:
  - to decompose the instruction into two or more execution parts, each of the two or more execution parts corresponding to one of the two or more array regions; and
  - for each execution part of the two or more execution parts, to delay issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

BRIEF DESCRIPTION OF THE DRAWINGS

The present invention will be described further, by way of example only, with reference to configurations thereof as illustrated in the accompanying drawings, in which:

FIG. 5*a* schematically illustrates instructions queued in control circuitry according to some configurations of the present techniques;

FIG. 5*b* schematically illustrates instructions queued in control circuitry according to some configurations of the present techniques;

FIG. 5*c* schematically illustrates instructions queued in control circuitry according to some configurations of the present techniques;

DESCRIPTION OF EXAMPLE CONFIGURATIONS

Figure 1:
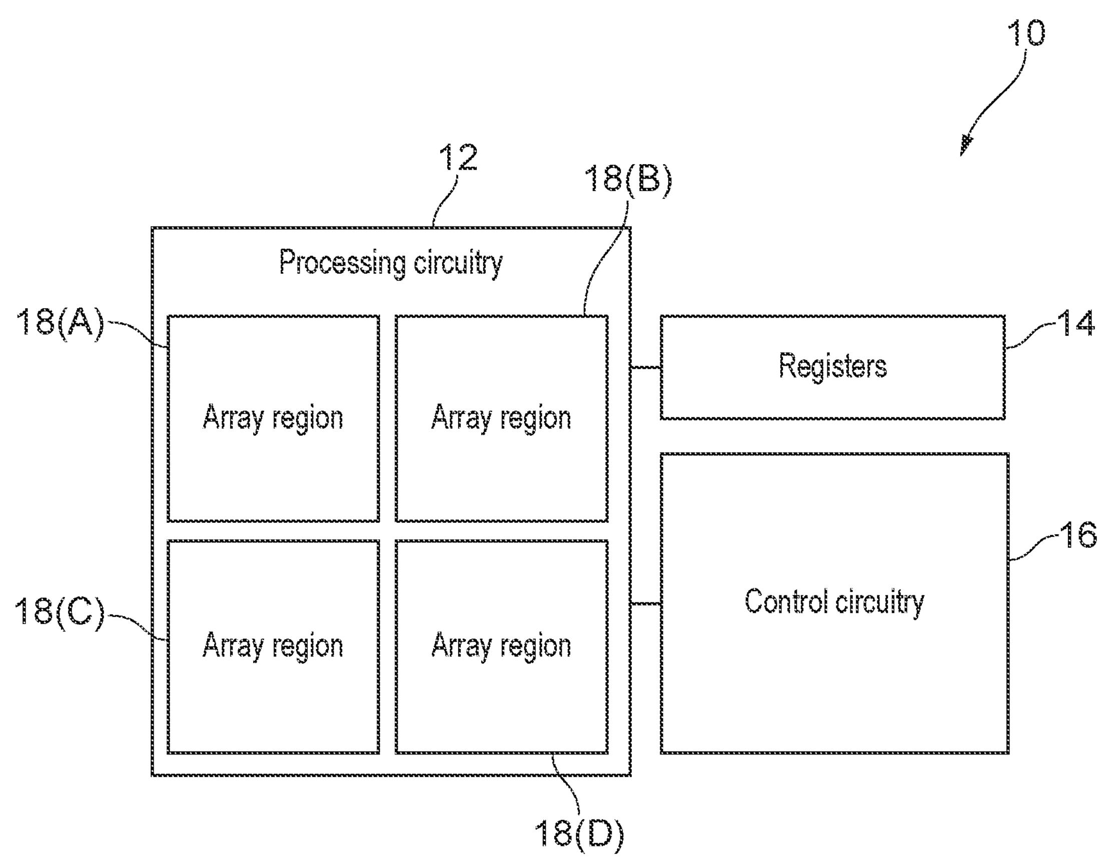
FIG. 1 schematically illustrates an apparatus according to some configurations of the present techniques.

Before discussing the configurations with reference to the accompanying figures, the following description of configurations is provided.

In accordance with some example configurations there is provided an apparatus comprising a plurality of registers configured to store data. The plurality of registers comprise at least one array register comprising a plurality of array regions. The apparatus is also provided with processing circuitry configured to receive issued instructions and to perform processing operations identified in the issued instructions. The apparatus is also provided with control circuitry comprising buffer circuitry to store one or more instructions prior to execution by the processing circuitry. The control circuitry is responsive to receipt of an instruction requiring access to two or more array regions of the plurality of array regions: to decompose the instruction into two or more execution parts, each of the two or more execution parts corresponding to one of the two or more array regions; and for each execution part of the two or more execution parts, to delay issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

The apparatus (which may be a data processing apparatus) is provided with the plurality of registers to store data that is to be accessed by the processing circuitry at a time of processing instructions. The registers may be provided closer to the processing circuitry than data caches or main memory and store operands that are being operated on by the currently processing instructions and results of the currently processed instructions. The registers may comprise a plurality of scalar registers and/or a plurality of vector registers each storing plural data elements. The registers also include an array register which is a large register that comprises plural data elements which may be plural scalar elements or plural vector elements. The array register comprises a plurality of array regions. These regions are distinct from one another and may each comprise storage for plural data elements. The processing circuitry is provided to access the array register in response to received instructions that require (specify) one or more data elements stored in the array register. Some instructions may require a single region of the array register, whilst other instructions may require multiple regions of the array register. The required regions of the array register may be used to store operands to be used for processing operations or results that are generated by the processing operations.

Some processing instructions may specify a large portion (e.g., all or half) of the array register. Alternatively, or in addition, some processing instructions may specify a much smaller portion of the array register, for example, a processing instruction could specify a single element of the array register. In order to prevent under-utilisation of the apparatus, scheduling techniques may be used that attempt to schedule instructions such that two sequentially issued instructions do not require access to a same element within the array register and can therefore be processed in parallel. The inventors have recognised that even using such scheduling techniques, an instruction requiring access to a large amount (e.g., all or half) of the array register may still get stalled behind an instruction requiring access to a small amount of the array register meaning that a large portion of the array register and the associated processing circuitry is unused whilst waiting for the instruction requiring the small amount of the array register to finish. As a result, the utilisation of the array register may fluctuate significantly between different instructions. This varying level of utilisation of the array register may result in both a variation in power consumption of the array register which may interfere with nearby processing circuitry, and may also result in large redundancies in the apparatus resulting in sub-optimal throughput.

The apparatus is provided with control circuitry that is provided with buffer circuitry to store one or more instructions prior to execution. The control circuitry may be arranged to identify instructions that require access to the array register and, in response to identifying those instructions, may be configured to decompose those instructions for execution on the different parts of the array register. For example, the decomposition may be a dynamic decomposition occurring at runtime based, for example, on one or more fixed or varying criteria. The decomposition of the instructions is on the basis of the regions of the array register to which the instructions require access. In other words, the instruction is decomposed into execution parts based on the location of the data that is required (either to be used as an operand when processing that instruction or to be generated as a result when processing that instruction). The different execution parts may, dependent on the specific data specified in the instruction, require access to one, a subset, or all of the array regions.

Once the instruction has been decomposed into the plurality of execution parts, the execution parts can be issued for execution independently of one another. In particular, where the instruction requires access to two or more array regions of the plurality of array regions, the instruction is split into two or more execution parts, each corresponding to one of the two or more array regions. The two or more execution parts can then execute independently of one another. For example, the two or more execution parts may issue for execution at a same time. Alternatively, the two or more execution parts may be issued during different cycles. This alternative may occur, for example, because prior processing operations accessing one of the array regions are predicted to complete before prior processing operations accessing another array region.

The timing of issuing of each of the execution parts is speculative and is based on a prediction of when that execution part can be executed hazard free by the processing circuitry. An instruction is assumed to be able to execute hazard free when it is issued in order with respect to other instructions writing to that array region. The prediction is carried out for each of the array regions independently so that the different execution parts may be issued for execution independently from and at different times to one another. Therefore, an instruction requiring access to large amount of the array register (i.e., requiring access to two or more array regions of the array register) that could previously have remained stalled behind an instruction accessing a single data element (or to a single array region) of the array register will be able to make progress in at least one of the array regions. As a result, the overall instruction throughput of the apparatus can be improved and fluctuations in the power consumption of the processing circuitry can be reduced.

The array register may be a one dimensional register, for example, a vector register, and each of the array regions may correspond to a sub-vector of the array register. In some configurations the array register is a two dimensional array register storing data elements identified by coordinates in a first array direction and a second array direction. Whilst the array register may be physically arranged as a two dimensional structure having spatial coordinates that correspond to the coordinates used to identify the data elements, this need not be the case. Rather, the dimensions referred to when describing the array register should be understood as referring to the number of indexes required to identify an element within the array register. For example, a two dimensional array register should be understood as an array register whose elements are accessed using two indexes. Similarly, the coordinates referred to as being used to access the data elements should be understood to refer to the indexes used to access the array register which may be physically set out in any form, e.g., as a one dimensional physical arrangement of elements or as a two dimensional physical arrangement of elements. In some configurations each of the array regions is a one dimensional array region. In other configurations, each of the array regions is a two dimensional array region, for example, as may be used to store a matrix representation of data elements.

In some configurations, the subdivision of the array register into elements may comprise only subdividing the array along a single one of the two array dimensions (directions). In some configurations the array register is subdivided into array regions in both the first array direction and the second array direction. The array regions may be of a same size as one another or may be different sizes. In some configurations the array regions have a same number of data elements in the first array direction and the second array direction. In other configurations the array regions have a different number of data elements in the first array direction and the second array direction. In some configurations the array regions may be contiguous groups of data elements in at least one array direction. In some configurations the array regions may comprise non-contiguous groups of data elements in at least one of the array directions. In some configurations the array regions may comprise interleaved groupings of data elements in at least one of the array directions.

In some configurations a number of subdivisions of the array register in the first array direction and a number of subdivisions of the array register in the second array direction are different. Subdividing the array by a different number of subdivisions in each of the array directions may be beneficial for certain types of instructions. The array register may be capable of storing different types of data elements (e.g., integer data elements, double precision data elements, floating point data elements, etc.). Each of these types of data elements may require a different number of bits of the array register to correctly represent that data type. For example, an array register may be configurable to store M 8-bit elements (where M is a positive integer) adjacent to one another in the first array direction and N rows of these M 8-bit elements adjacent to one another in the second array direction. The array register may also be configurable to store M/2 16-bit elements adjacent to one another in the first direction and N rows of these M/2 16-bit elements adjacent to one another in the second array direction. As a result, the utilisation of the array in one direction may depend on the type of element being stored. Thus by having fewer array subdivisions in the first array direction, the control circuitry may be better able to balance the processing load whilst ensuring that a single data element is not split over multiple array regions.

In some configurations the instruction identifies at least one location range in the array register; and the control circuitry is configured, for each execution part, to predict a delay before the execution part can be processed hazard free by the processing circuitry, the delay comprising at least an expected number of remaining instruction cycles for the processing circuitry to process currently executing instructions specifying locations in the array register that overlap with the at least one location range. The location range may span one or more of the array regions dependent on the use case and may be different for different instructions. For example, sequential instructions, each specifying different locations in the same array region may (assuming that there are no other instructions utilising those locations) be issued for execution in parallel. As another example, sequential instructions specifying locations that span multiple array regions and that overlap with one another in one array region may be issued for execution in parallel in some array regions but not in the one array region in which they overlap. The control circuitry may be configured to record information identifying the expected number of remaining instructions until each location in the array register is available for execution of a next instruction and the prediction of the delay can then be calculated based on this information. This information may be stored on a per element basis, or on a basis of a group of elements. As a result, for each array region, the control circuitry is able to estimate a delay until an execution part corresponding to that array region is able to be executed. Sequential execution parts of different instructions each specifying locations that do not overlap with one another may be assigned a same predicted delay as neither will cause a data hazard for the other. This approach allows the control circuitry to predict the delay before the next instruction is issued.

In some configurations the control circuitry is configured to store an indication of a number of pending instruction cycles required to process each execution part; and the delay comprises at least the sum of the expected number of remaining instruction cycles and the number of pending instruction cycles required to process prior execution parts stored in the buffer circuitry specifying locations in the array register that overlap with the at least one location range. In addition to making the prediction based on the expected number of remaining instruction cycles, some configurations also make use of the number of pending instruction cycles required to process each execution part that specifies a location range overlapping with the instruction. In other words, for each pending execution part specifying a location range, the control circuitry identifies the expected number of remaining instruction cycles for that location range, and the number of pending instruction cycles required to process prior execution parts that also specify that location range. This approach allows the control circuitry to predict the delay for a number of pending instructions including the next pending instruction and subsequent instructions that are received by the control circuitry whilst the next pending instruction is still stored waiting to be issued.

In some configurations the control circuitry is configured to determine unrequired array regions of the array register having no overlap with the at least one location range, and to omit generation of the execution parts corresponding to the unrequired array regions. In other words, the control circuitry is configured to only decompose the instructions into execution parts that correspond to array regions that overlap with the at least one location range. For array regions that do not overlap with the at least one location range, no corresponding execution part is generated. This approach ensures that there no unnecessary execution parts, which could otherwise be discarded at the issuing stage, are generated.

In some configurations the control circuitry is configured to maintain a plurality of delay counters, the plurality of delay counters indicative of the delay for one of the two or more execution parts; and each of the plurality of delay counters are responsive to a determination that the expected number of remaining instruction cycles is less than zero, to maintain a negative count of the expected number of remaining instruction cycles. The control circuitry may have a delay counter assigned to each execution part in each array region. The number of counters required may therefore be equal to the number of array regions multiplied by the number of execution parts that can be stored for each array region. The count may be represented by any numerical system capable of storing negative numbers. For example, the counter may use a ones complement representation, a twos complement representation, or a representation comprising a sign bit indicative as to whether the count value is positive or negative. By maintaining delay counters capable of representing a negative value, the control circuitry can choose when to issue the execution parts based on additional delay information that may be available from the processing circuitry or from elsewhere in the apparatus.

The additional delay may be a general delay representative of a delay associated with the processing circuitry as a whole (i.e., the additional delay information may not be specific to the individual array regions). In some configurations the delay comprises a predicted array region specific delay for the one of the two or more array regions corresponding to the execution part. The delay may represent additional delay information that is a result of one or more stall events in the array region, one or more power related events in the array region, and/or one or more global events specific to whole array register. By incorporating the predictor array region specific delay in the delay, the control circuitry is able to improve scheduling of the execution parts for each of the array regions.

In some configurations the processing circuitry is configured to issue feedback information indicative of a number of instruction cycles between receipt of the issued instruction and an instruction cycle at which the issued instruction could be executed hazard free; and the control circuitry is configured to adjust the predicted array region specific delay based on the feedback information. The predicted array region specific delay is maintained by the control circuitry and may represent an estimate of the delay associated with corresponding array region.

In some configurations the processing circuitry is responsive to an identification that the issued instruction could have been executed hazard free earlier than it was received, to issue the feedback information to request a reduction of the delay. Where the feedback information issued by the processing circuitry indicates that the number of instruction cycles between receipt of the issued instruction and the instruction cycle at which the issued instruction is executed is small and the issued instruction could potentially have been executed earlier had it been issued earlier (e.g., because the execution parts are being issued too late), the control circuitry may decrease the predicted array region specific delay. Issuing execution parts as issued instructions too late may result in the processing circuitry having too few instructions to process and may result in underutilisation of the processing circuitry. By providing feedback between the processing circuitry and the control circuitry, the control circuitry may be able to improve the utilisation of the processing circuitry.

In some configurations the processing circuitry is responsive to an identification that the issued instruction was received too early to be immediately executed hazard free, to stall the issued instruction and to issue the feedback information to request an increase of the delay. Where the feedback information issued by the processing circuitry indicates that the number of instruction cycles between receipt of the issued instruction (i.e., the execution part issued as an issued instruction for that array region) and the instruction cycle at which the issued instruction is large (e.g., because the execution parts are being issued too early), the control circuitry may increase the predicted array region specific delay to reduce the number of execution parts being issued as issued instructions. Issuing execution parts as issued instructions too early may result in an increase in the number of issued instructions queueing in the processing circuitry increasing which could, in turn, lead to a stall in the processing circuitry. By providing feedback between the processing circuitry and the control circuitry, the control circuitry may be able to reduce the likelihood of stalls occurring.

In some configurations the request for the increase of the delay comprises stall information indicative of a number of stall cycles by which the issued instruction was stalled; the control circuitry is responsive to the stall information indicating that the number of stall cycles is below a predefined threshold, to determine whether to adjust the predicted array region specific delay based on a global congestion metric; and the control circuitry is responsive to the stall information indicating that the number of stall cycles exceeds the predefined threshold, to adjust the predicted array region specific delay independent of the global congestion metric. The feedback information may be provided as a two-bit value. The two-bit value may represent four different feedback signals which may include an indication that the issued instructions are received too late, an indication that the issued instructions are received on time, a weak indication that the instructions are received too early (stall information indicating that the number of stall cycles is below a predefined threshold), and a strong indication that the instructions are received too late (stall information indicating that the number of stall cycles exceeds the predefined threshold). The control circuitry may be configured to ignore the weak indication, for example, based on a number of received instructions and how full the buffer circuitry is. The control circuitry may be configured such that it is unable to ignore the strong indication and is responsive to the strong indication to adjust the predicted array region specific delay independent of a fullness of the buffer circuitry. In some configurations, this adjustment of the buffer circuitry may result in the buffer circuitry filling and a stall signal having to be sent to circuitry providing instructions to the control circuitry.

The processing circuitry may be provided as global processing circuitry that is able to access each of the array regions. In some configurations the processing circuitry is arranged as a processing array divided into a plurality of processing regions each arranged to perform the processing operations for a corresponding array region of the plurality of array regions. The processing array may comprise one or more common processing portions able to receive operands from other array regions, and able to pass results or data as operands to be used in other array regions. The processing array may also be provided in combination with global processing circuitry and arranged such that the processing load is shared between the processing array and the global processing circuitry dependent on the specific access pattern and the specific issued instructions that are being executed.

In some configurations the processing circuitry is capable of executing different instructions in different ones of the plurality of array regions at a same time. Due to the various timing constraints associated with issued instructions in different ones of the plurality of array regions, the delay associated with each of those array regions may be different. As a result, different issued instructions may be executed different regions of the processing array at the same time as one another.

In some configurations when storing the instruction in the buffer circuitry would cause the buffer to overflow, the control circuitry is responsive to the instruction to signal a stall to frontend circuitry providing instructions to the control circuitry. The frontend circuitry may comprise decoder circuitry configured to decode instructions prior to those instructions being passed to the control circuitry. The decoder circuitry may receive instructions of an instruction set architecture and may be arranged to decode each of those instructions into one or more micro-operations to be passed to the control circuitry.

Particular configurations will now be described with reference to the figures.

FIG. 1 schematically illustrates an apparatus 10 according to some configurations of the present techniques. The apparatus 10 is provided with control circuitry 16, registers 14, and processing circuitry 12. In addition to the registers 14, the apparatus 10 is provided with an array register 18 which is divided into a plurality of array regions including a first array region 18(A), a second array region 18(B), a third array region 18(C) and a fourth array region 18(D). The registers 14 and the array register 18 are provided to store data values to be accessed by the processing circuitry 12 whilst processing instructions and for the processing circuitry 12 to store results of processing operations. The control circuitry 16 is provided to receive instructions and to decompose those instructions into execution parts. For example, the control circuitry may receive an instruction requiring access to the first array region 18(A) of the array register 18 and the control circuitry may decompose that instruction into a single execution part. As another example, the control circuitry may receive an instruction requiring access to the third array region 18(C) and the fourth array region 18(D) and may decompose that instruction into two execution parts. The control circuitry 16 is configured to delay issuing the execution parts until it is predicted that the execution part can be processed hazard free by the processing circuitry. As a result, the control circuitry 16 may issue execution parts of an instruction that has been decomposed into two or more execution parts in different cycles based on when it is predicted that each of those execution parts can be processed hazard free.

It would be readily apparent to the skilled person that the illustrated layout of components is provided for illustrative purpose only and that the physical arrangement of circuitry may be differently provided. Indeed, the control circuitry, the processing circuitry, and the registers may be provided as distinct circuitry blocks or, alternatively, one or more distinct blocks of circuitry could be provided that together provide the function of the control circuitry, the processing circuitry and the registers.

Figure 2:
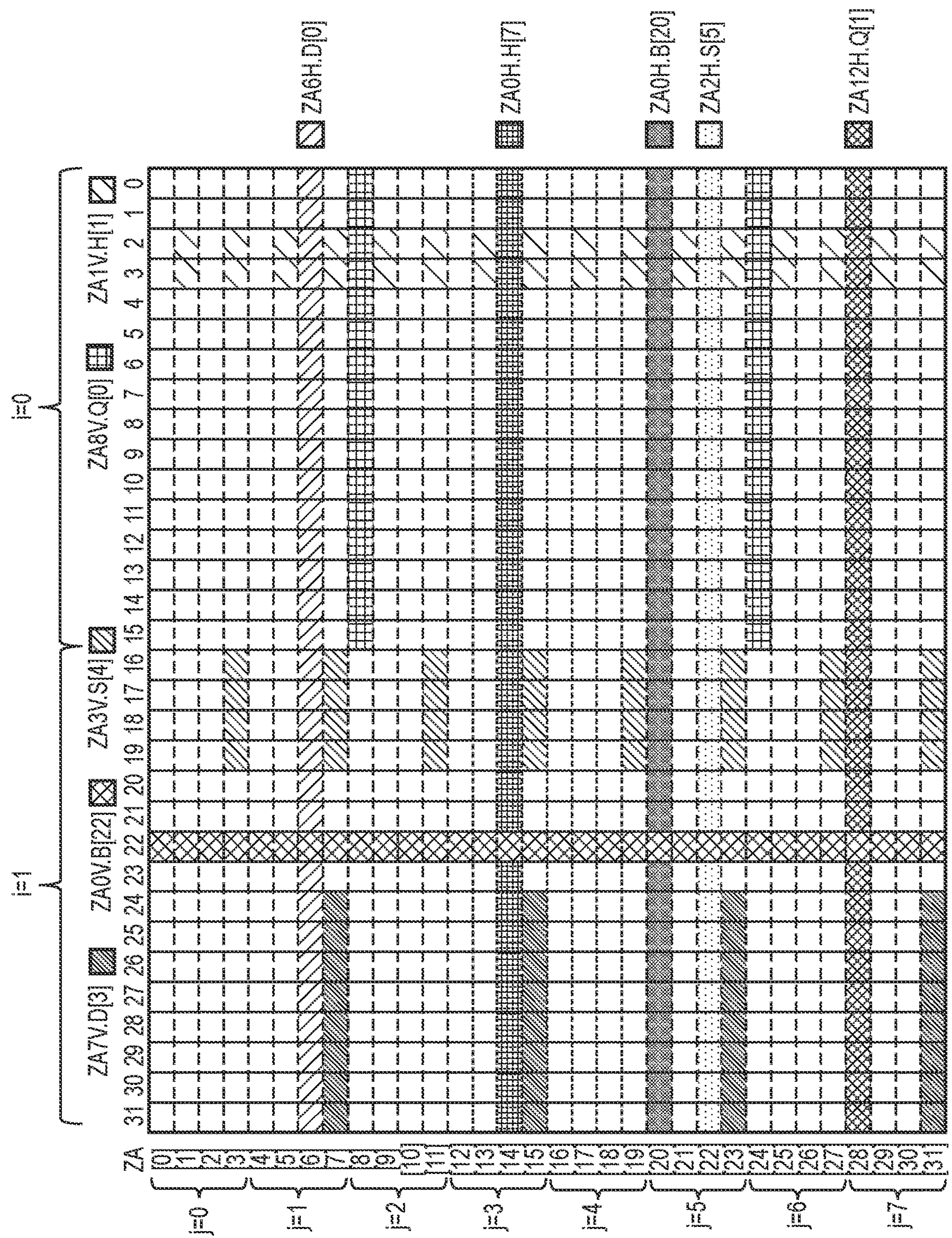
FIG. 2 schematically illustrates an array register according to some configurations of the present techniques.

FIG. 2 schematically illustrates an array register provided according to some configurations of the present techniques. The array register comprises a plurality of different array locations. In the illustrated array register, the array register is a 32 by 32 array of locations, each location in the array register may comprise a data element. The locations in the array register are identified using two index values such that a location in the array register may be specified by an index in a first direction and in a second direction.

In the example of FIG. 2, the array register is addressable in a wide variety of ways as shown:

- in the examples ZA6H.D[0], ZAOH.H[7], ZA2H.S[5], ZA12H.Q[1] a horizontal slice of data from a single array row of the array register is accessible as a vector operand, with different sized vector element sizes denoted by the .D, .H, .S, .Q notation;
- in the example ZA0V.B [22], a vertical slice of data from a given column position [22] within the array register is accessible as a vector operand. Again, it would be possible to provide different data element sizes for the vector operand accessed as a vertical slice, similar to the horizontal slices shown for FIG. 2.
- As shown in examples ZA7V.D[3], ZA3V.S[4], ZA1V.H [1], ZA8V.Q[0], it is also possible to access, as a single vector operand, a tile of elements where each portion of the tile is extracted from a different row of the array register. For example, ZA7V.D[3] comprises 4 sets of 8 elements selected from column positions [31:24] of each of rows 7, 15, 23, and 31; ZA3V.S[4] comprises 8 sets of 4 elements selected from column positions [19:16] of each of rows 3, 7, 11, 15, 19, 23, 27 and 31; ZA1V.H[1] comprises 16 sets of 2 elements selected from column positions [3:2] of each of the odd-numbered rows of the array register, and ZA8V.Q[0] comprises two sets of 16 elements selected from column positions [15:0] of row 8 and row 24 of the array register respectively.

It will be appreciated that this is just a subset of the addressing patterns that could be available.

The array register is split into a plurality of array regions. In the illustrated configuration, the array register is split into two in the horizontal direction and into eight in the vertical direction. Each of the array regions can be identified based on a region index i indicating the array region position in the horizontal direction, and a region index j indicating the array region position in the vertical direction. The array is subdivided into a greater number of regions in the vertical direction than in the horizontal direction. Because the array register is capable of storing data elements in different formats (which may require a different number of bits), data elements stored in some formats may span plural locations of the array register in the horizontal direction. By only subdividing the array register once in the horizontal direction, data elements of different sizes can be processed without having individual data elements split across different array regions.

During processing, each of the array regions is accessed when a processing instruction specifies locations in the array register that overlap with that array region. By way of example, the example addressing schemes set out above may each be decomposed into plural execution parts accessing two or more of the array regions. Using the notation {i,j} to refer to refer to the regions:

ZA7V.D[3] overlaps with array regions {1,1}, {1,3}, {1,5}, and {1,7};

ZA0V.B[22] and ZA3V.S[4] overlap with array regions {1,0}, {1,1}, {1,2}, {1,3}, {1,4}, {1,5}, {1,6}, {1,7}, and {1,8};

ZA8V.Q[0] overlaps with array regions {0,2} and {0,6};

ZA6H.D [0] overlaps with array regions {0,1} and {1,1};

ZAOH.H[7] overlaps with array regions {0,3} and {1.3};

ZA0H.B[20] and ZA2H.S[5] overlap with array regions {0,5} and {1,5}; and ZA12H.Q[1] overlaps with array regions {0,7} and {1,7}.

In response to receiving an instruction accessing the array regions using the addressing schemes set out above, the control circuitry will decompose the instructions into plural execution parts, one for each array region accessed. Each of the execution parts may be independently (i.e., regardless as to whether the other execution parts are ready for execution) issued for execution when it is predicted that those execution parts can be executed hazard free.

In alternative configurations the array regions may be interleaved regions. For example, the region j=0 may include rows 0, 8, 16, and 24; region j=1 may include rows 1, 9, 17, and 25; region j=2 may include rows 2, 10, 18, and 26; region j=3 may include rows 3, 11, 19, and 27; region j=4 may include rows 4, 12, 20, and 28; region j=5 may include rows 5, 13, 21, and 29; region j=6 may include rows 6, 14, 22, and 30, region j=7 may include rows 7, 15, 23, and 31; and region j=7 may include rows 7, 15, 23, and 31. Alternative methods of splitting the array register into array regions would be readily apparent to the skilled person and may be chosen based on use cases for a particular apparatus.

Figure 3:
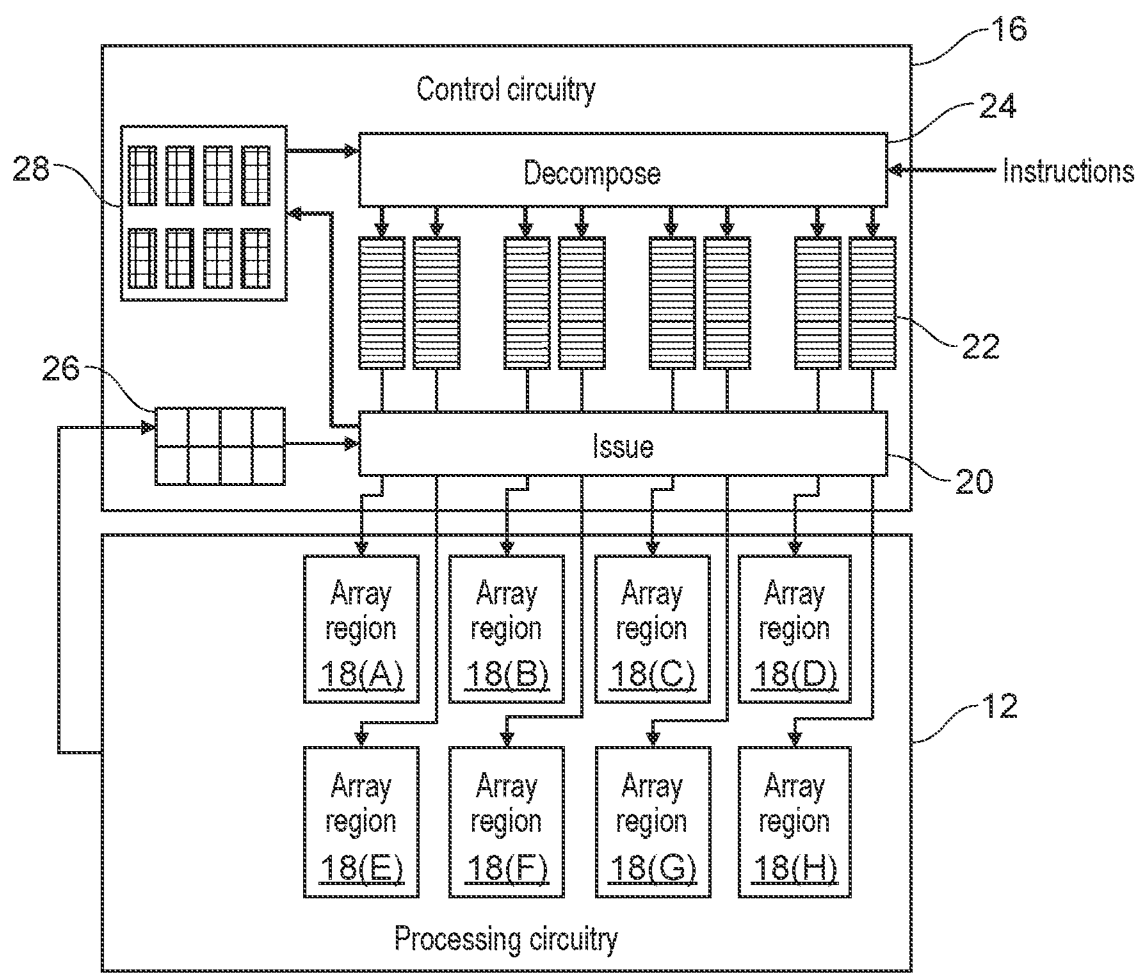
FIG. 3 schematically illustrates control circuitry according to some configurations of the present techniques.

FIG. 3 schematically illustrates details of control circuitry 16 and processing circuitry 12 according to some configurations of the present techniques. The control circuitry 16 is provided with decompose circuitry 24, buffer circuitry 22 arranged as a plurality of queues, issue circuitry 20, region delay storage circuitry 26, and tracking circuitry 28. The processing circuitry 12 is configured to perform processing in each of a plurality of regions of an array register 18. In the illustrated configurations, the array register 18 comprises eight different regions 18(A)-18(H).

The region delay storage circuitry 26 is configured to store information indicative of a predicted additional delay associated with each of the array regions 18.

The tracking circuitry 28 is configured to store expected delays associated with execution parts that have been issued to the processing circuitry. The decompose circuitry 24 receives a sequence of instructions and is configured to identify instructions requiring access to the array register. The decompose circuitry is configured to identify which array regions of the array register an instruction requires access to and is configured to break down the instruction into a plurality of execution parts. Each execution part is stored in the buffer circuitry 22 in a queue corresponding to the identified array region along with an indication of an expected number of cycles that are predicted to be required to process that execution part. The predicted number of execution cycles may be obtained, for example, from a lookup table (not illustrated). The decompose circuitry is configured to identify a delay for each of the execution parts. The delay that is predicted for each execution part is equal to the maximum number of instruction cycles indicated in the tracking circuitry 28 for regions that overlap with the locations identified in the execution part added to the number of instruction cycles associated with execution parts that are ahead of the current execution part in the buffer circuitry. The delay may be indicated using a counter.

The control circuitry is configured to update (i.e., to decrease) the delays indicated in the buffer circuitry 22, and the delays indicated in the tracking circuitry 28 on a per cycle basis. Furthermore, the control circuitry is responsive to feedback from the processing circuitry to update the delays indicated in the region delay storage circuitry 26.

The issue circuitry 20 is configured to add the delay associated with execution parts in the buffer circuitry with a region specific delay stored in the region delay storage structure 26. If the total delay (the sum of the delay associated with the execution part and the region specific delay) is less than or equal to zero, then the issue circuitry issues that execution part to the processing circuitry 12 as an issued instruction requiring access to the corresponding array region 18. When the instruction is issued, the issue circuitry 20 also updates the delays stored in the tracking circuitry to increase delays associated with the locations specified by that execution part. The delays are increased by the number of cycles that it is expected that the issued instruction will take.

By storing tracking information 28, delay information associated with the execution parts and information indicating an expected number of cycles of the execution parts, the decompose circuitry 24 is able to calculate an estimated delay before each new execution part would be issued as an issued instruction for execution. By combining this with the per region delay obtained from the region delay storage structure 26, the control circuitry is able to maintain a steady flow of issued instructions to each region of the processing circuitry.

Figure 4:
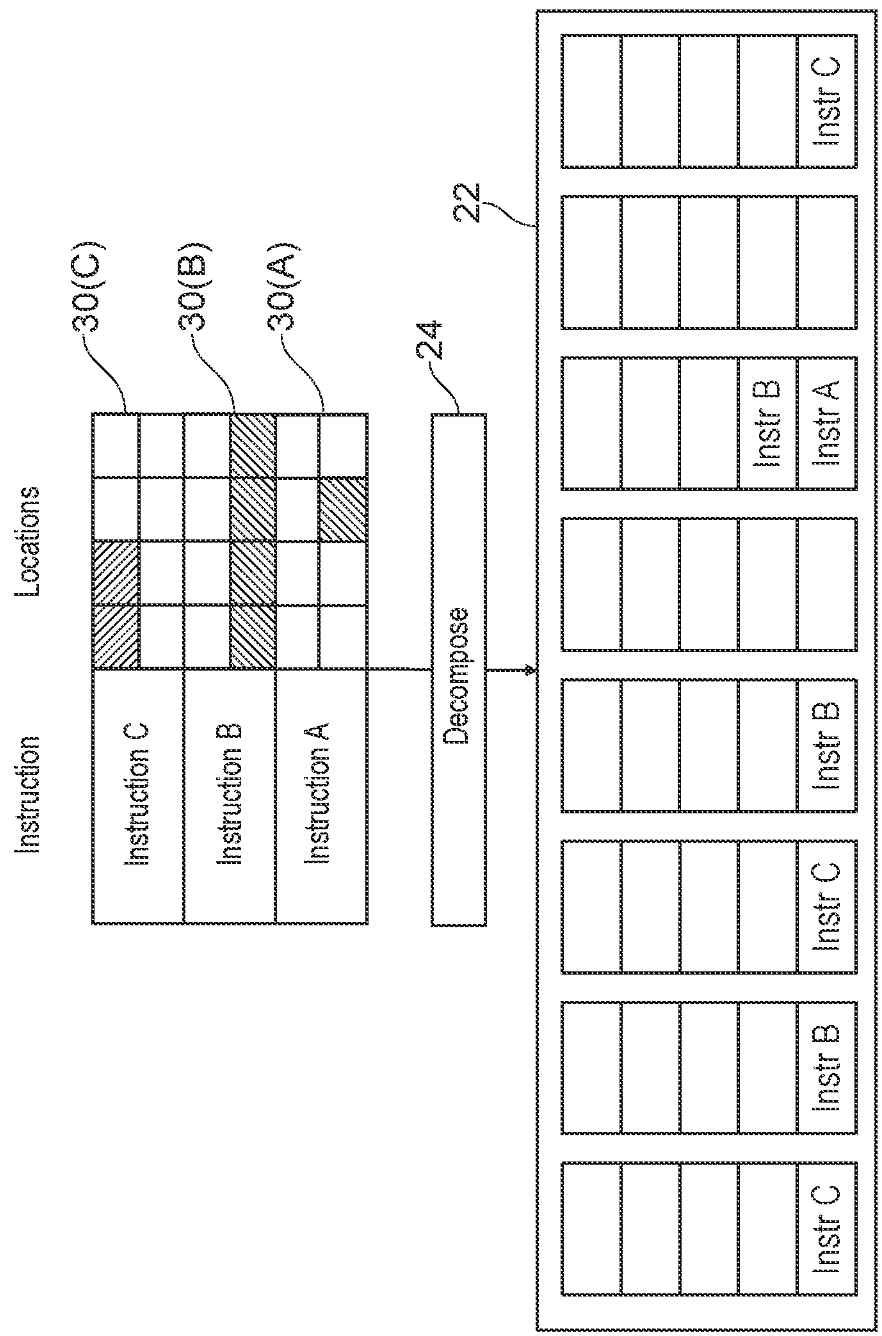
FIG. 4 schematically illustrates instruction decomposition according to some configurations of the present techniques.

FIG. 4 schematically illustrates the decomposition of instructions into execution parts by the decompose circuitry 24. The decompose circuitry receives a sequence of instructions: instruction A, instruction B, and instruction C. The instructions are received in that order and each include information identifying locations in the array register that they need to access. Instruction A includes location information A 30(A), instruction B includes location information B 30(B), and instruction C includes location information C 30(C). As a first step, the decomposition circuitry receives the instructions and decomposes them into execution parts. In the illustrated configuration, instruction A specifies a single array region and is decomposed into a single execution part which is stored in the storage circuitry 22. Instruction B specifies a row of array regions and is decomposed into corresponding execution parts which are placed into the storage circuitry 22 behind instruction A. Instruction C specifies a pair of locations and is decomposed into two execution parts which are placed into the storage circuitry 22. Because instructions A and B each specify one common array region, one of the execution parts associated with instruction B is placed in the storage circuitry 22 behind the execution part associated with instruction A.

FIGS. 5*a* to 5*c* schematically illustrate a sequence of counters that are stored by the control circuitry to track when each execution part is issued. Each of FIGS. 5*a* to 5*c* illustrates a set of instructions queued in the buffer circuitry 22 for a single array region (array region {0,0}), and tracking information for region {0,0} stored in tracking circuitry 28. The figures also illustrate information indicative of a per-region delay for each of (in the illustrated configuration) 4 array regions stored in the per region tracking circuitry 26.

FIG. 5*a* illustrates the tracked information in a first cycle, cycle n. In the first cycle, the per region delay for region {0,0} is 2 cycles, the per region delay for region {0,1} is 0 cycles, the per region delay for regions {1,0} and {1,1} is 1 cycle. The tracking information 28 stores information indicative of an expected number of remaining instruction cycles for the processing circuitry to process currently executing instructions. The tracking information is provided on a per location basis for each location in the array region. In the illustrated configuration, array region {0,0} is broken into 16 locations arranged in a 4 by 4 grid and addressed using an index X0 to X3 in the horizontal direction and X0 to X3 in the vertical direction. It can be seen that locations [X0,Y0] to [X3,Y0](corresponding to the row Y0) each have 4 expected remaining execution cycles; locations [X0,Y1] to [X3,Y1](corresponding to the row Y1) each have 1 expected remaining execution cycles; locations [X0,Y2] to [X3,Y2] (corresponding to the row Y0), and locations [X0,Y3] and [X1,Y3] each have −2 expected remaining execution cycles; and locations [X2,Y3] to [X3,Y3] each have −5 expected remaining execution cycles. It is noted that a negative number of execution cycles is interpreted as an indication that the issued instructions which are predicted to prevent hazard free executing in those regions is, in the absence of any per region delay, expected (predicted) to have finished.

The storage circuitry 22 is currently tracking 3 instructions: Instruction F, Instruction G, and Instruction H. Instruction F accesses array regions (X0,2,Y2,2) indicating that access is required to locations in the array beginning at position [X0,Y2] and having a width of 2 in the horizontal direction and 2 in the vertical direction. The instruction is stored in association with an expected delay, in this case of −2 instruction cycles until the specified regions are expected to be available. The instruction is also stored in association with the number of cycles that it is predicted to take during execution, in this case 4 cycles. Instruction G accesses array regions (X0,4,Y1,1) indicating that access is required to locations in the array beginning at position [X0,Y1] and having a width of 4 in the horizontal direction and 1 in the vertical direction. The instruction is stored in association with an expected delay, in this case of 1 instruction cycles until the specified regions are expected to be available. The instruction is also stored in association with the number of cycles that it is predicted to take during execution, in this case 2 cycles. Instruction H accesses array regions (X0,4, Y0,1) indicating that access is required to locations in the array beginning at position [X0,Y0] and having a width of 4 in the horizontal direction and 1 in the vertical direction. The instruction is stored in association with an expected delay, in this case of 4 instruction cycles until the specified regions are expected to be available. The instruction is also stored in association with the number of cycles that it is predicted to take during execution, in this case 2 cycles.

In the illustrated configuration the delay associated with instruction F is negative indicating that, subject to any per region delay, this execution part may be eligible to be issued for execution as an issued instruction. The per region delay for region {0,0} is 2 so the total expected delay before the execution part corresponding to instruction F can be issued is −2+2=0 indicating that instruction F can be issued as an issued instruction.

FIG. 5*b* schematically illustrates the state of the storage circuitry 22, the per region delay storage circuitry 26, and the tracking circuitry 28 for region {0,0}. As instruction F was issued for execution, it is removed from the storage circuitry 22. The region {0,0} tracking information stored in the tracking circuitry 28 is updated to add the counters associated with the locations specified by instruction F to the number of cycles that instruction F is expected to take. Instruction F specified locations (X0,2,Y2,2), i.e., the four locations: [X0,Y2], [X0,Y3], [X1,Y2], and [X1,Y3]. Each of these locations previously stored a counter value of −2 which is updated to indicate that the instruction will take 2 cycles. The delays associated with each of the locations in the tracked region (array region {0,0}) are decreased by one cycle as the instruction counter progresses.

FIG. 5*c* schematically illustrates a next instruction cycle, cycle n+2, in which a new instruction, instruction I, is added to the storage circuitry 22. Instruction I specifies locations (X0,4,Y1,1) and is predicted to require 4 cycles. The locations that are being accessed by instruction I are equal to the locations that are being accessed by instruction G. Therefore, the total delay before instruction I can be issued as an issued instruction is equal to the expected delay indicated in the tracking circuitry 28, i.e., −1 cycles plus the total number of cycles that are expected for instruction G, i.e., 2 cycles resulting in a delay of 1 cycle. The delays associated with the counters are each decremented by 1 as a result of the cycle incrementing.

In this way, the delays associated with each of the instructions can be tracked and an array region specific delay can also be maintained to cause instructions to be buffered in the storage circuitry for a longer or shorter time dependent on how quickly the processing circuitry is able to process those instructions.

It can be seen that, in the illustrated configuration of FIGS. 5*a* to 5*c*, there is some redundancy in storing the number of delay cycles in both the storage circuitry 22 and the tracking circuitry 28. This redundancy is present for clarity of illustration and to illustrate the delays present for each of the instructions. It would be readily apparent to the skilled person that the delay indicated in the storage circuitry 22 could, in some configurations, be omitted and inferred from the tracking information 28 at each stage. Furthermore, it would be readily apparent that instructions from the storage circuitry may, in some configurations, be issued in-order or out-of-order based on the manner in which the instructions are tracked and the information stored. Furthermore, the tracking information 28 may be provided as a coarse grained tracking or a fine grained tracking. Alternatively, rather than providing tracking information 28 on a per region basis, the storage circuitry 22 may retain tracking information related to issued instructions for at least the predicted number of cycles associated with those instructions and may estimate the expected number of execution cycles from the retained tracking information.

Figure 6:
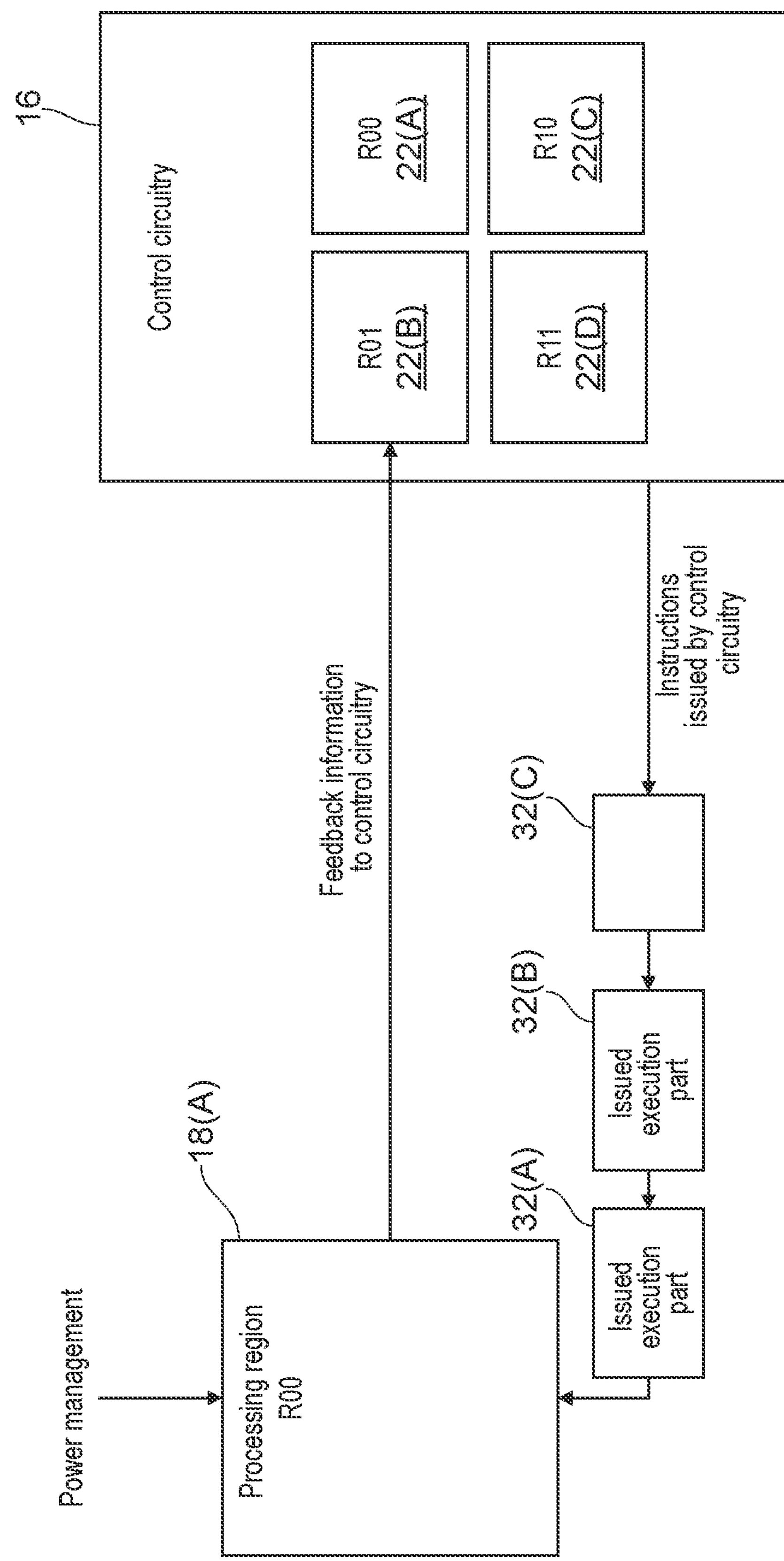
FIG. 6 schematically illustrates an apparatus according to some configurations of the present techniques.

FIG. 6 schematically illustrates details of issuing of instructions by control circuitry 16 according to some configurations of the present techniques. The control circuitry 16 comprises storage circuitry 22 to store information indicative of execution parts that are being delayed prior to being passed to processing circuitry to be processed in a processing region 18(A). The processing region 18(A) receives issued instructions that are issued by the control circuitry 16 once the delay associated with execution parts has finished. The processing region 18(A) is subject to power management and receives power management control information which triggers the processing region to operate in different power states. For example, the processing region 18 may respond to the power management information by moving to a lower throughput state. As a result, the rate at which the processing region 18(A) is able to process instructions reduces. In such a situation, the rate at which the issued instructions are processed by the processing region reduces and the issued instructions may be queued in buffer circuitry 32 provided by the processing circuitry. In the illustrated configuration, the processing circuitry is able to buffer three issued instructions in three different buffer slots including: a first buffer slot 32(A), a second buffer slot 32(B), and a third buffer slot 32(C). The processing region 18(A) is responsive to a determination that the issued instructions have been buffered for one or more cycles prior to execution to transmit feedback information requesting that the per region delay is increased. Similarly, the processing region 18(A) is responsive to the buffer circuitry 32 emptying to transmit feedback information requesting that the per region delay is decreased. In this way, the processing circuitry and the control circuitry 16 are able to work together to manage throughput of instructions. The processing circuitry may be arranged to transmit feedback information each cycle. The feedback information may be used to maintain a predefined number of instructions in the buffer slots. For example, the processing circuitry may aim to maintain one buffer slot full and may transmit a two-bit value as the feedback information to trigger the control circuitry to update the per region delay. When all of the buffer slots are empty, the processing circuitry may transmit "00" as the feedback information to indicate that the issued instructions are not being provided at a high enough rate. When a single one of the buffer slots is in use, the processing circuitry may transmit "01" as the feedback information to indicate that the issued instructions are being provided at the correct rate. When two of the buffer slots are in use, the processing circuitry may transmit "10" as the feedback information to provide a weak indication that the issued instructions are being provided too rapidly. When all three of the buffer slots are in use, the processing circuitry may transmit "11" as the feedback information to provide a strong indication that the issued instructions are being provided too rapidly. It would be readily apparent to the skilled person that more or fewer buffer slots could be provided and that the thresholds and timings for the feedback information may be adapted based on the implementation.

Figure 7:
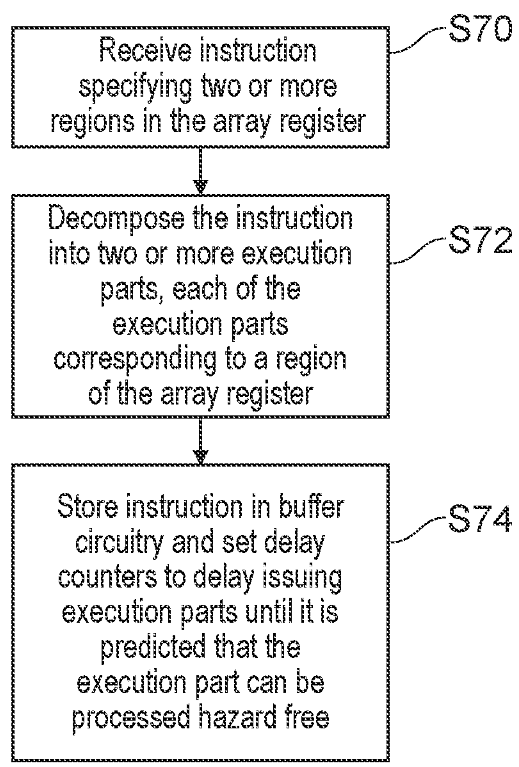
FIG. 7 schematically illustrates a sequence of steps carried out according to some configurations of the present techniques.

FIG. 7 schematically illustrates a sequence of steps carried out by an apparatus according to some configurations of the present techniques. Flow begins at step S70 where an instruction specifying two or more array regions in an array register is received. Flow then proceeds to step S72 where the instruction is decomposed into two or more execution parts, each of the two or more execution parts corresponding to one of the specified array regions of the array register. Flow then proceeds to step S74 where the execution parts are stored in buffer circuitry and a delay counter is set for each execution part to delay issuing the execution parts until it is predicted that the execution part can be processed hazard free.

Figure 8:
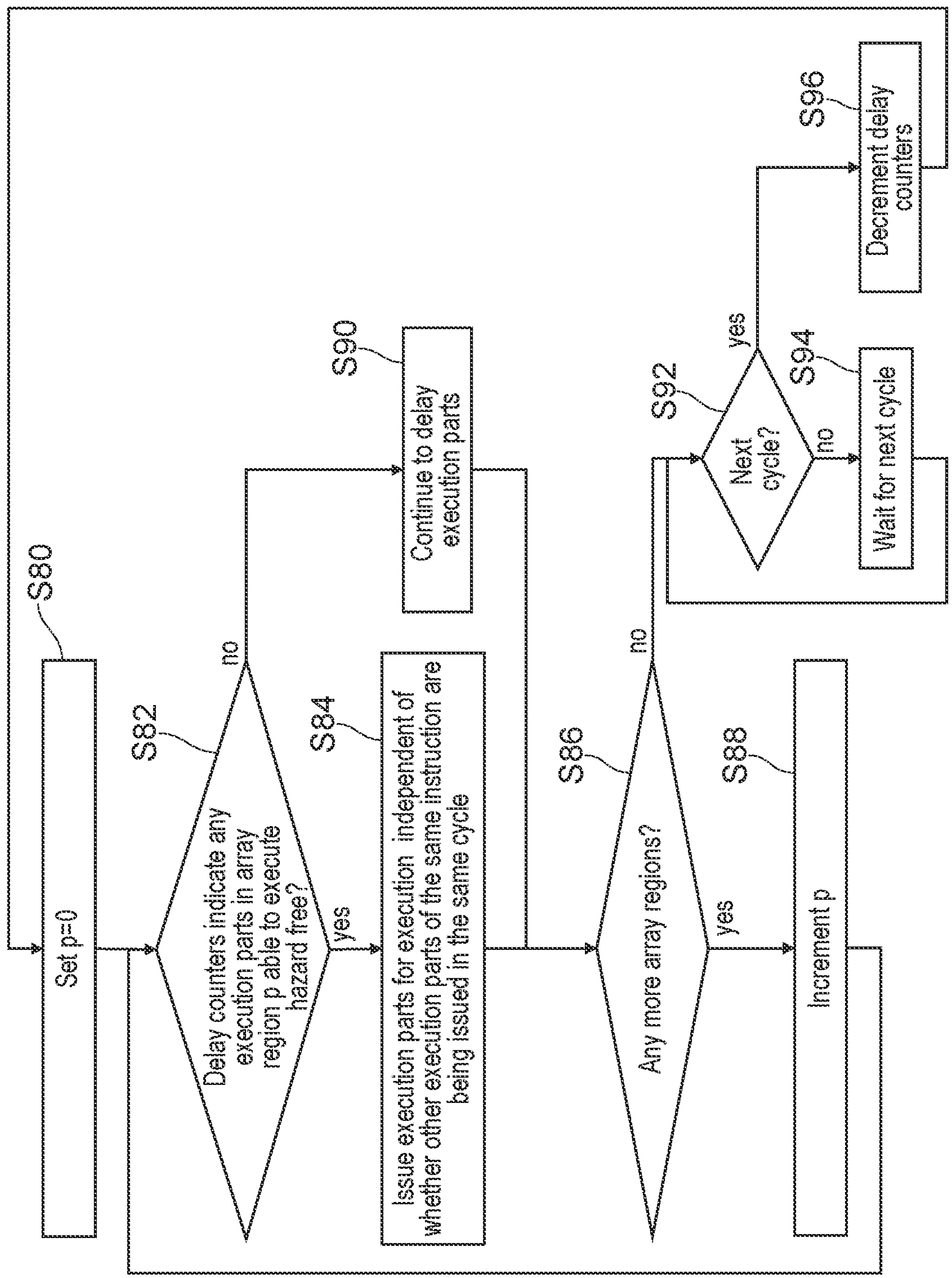
FIG. 8 schematically illustrates a sequence of steps carried out according to some configurations of the present techniques.

FIG. 8 schematically illustrates a sequence of steps carried out by an apparatus according to some configurations of the present techniques. Flow begins at step S80 where a variable p is set to 0 corresponding to an array region of an array register. Flow then proceeds to step S82 where it is determined if any delay counts associated with region P indicate that an execution part in that array region is able to execute hazard free. If, at step S82, it is determined that there are no execution parts that can be executed hazard free, then flow proceeds to step S90 where the execution parts are delayed before flow proceeds to step S86. If, at step S82, it was determined that the delay counters indicate that there are execution parts that can be issued hazard free, then flow proceeds to step S84 where the execution parts are issued independent of whether other execution parts of the same instruction are being issued in the same cycle. Flow then proceeds to step S86 where it is determined if there are any more array regions. If, at step S86, it is determined that there are more array regions, then flow proceeds to step S88 where P is incremented before flow returns to step S82. If, at step S86, it is determined that there are no more array regions, then flow proceeds to step S92, where it is determined if it is the next execution cycle. If, at step S92, it is determined that it is not the next execution cycle, then flow proceeds to step S94 to wait for the next cycle before returning to step S92. If, at step S92, it is the next execution cycle, then flow proceeds to step S96 where the delay counters are decremented before flow returns to step S80. It would be readily apparent to the skilled person that the sequential consideration of the different array regions is for illustrative purpose only and that the regions may be considered either sequentially or in parallel.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
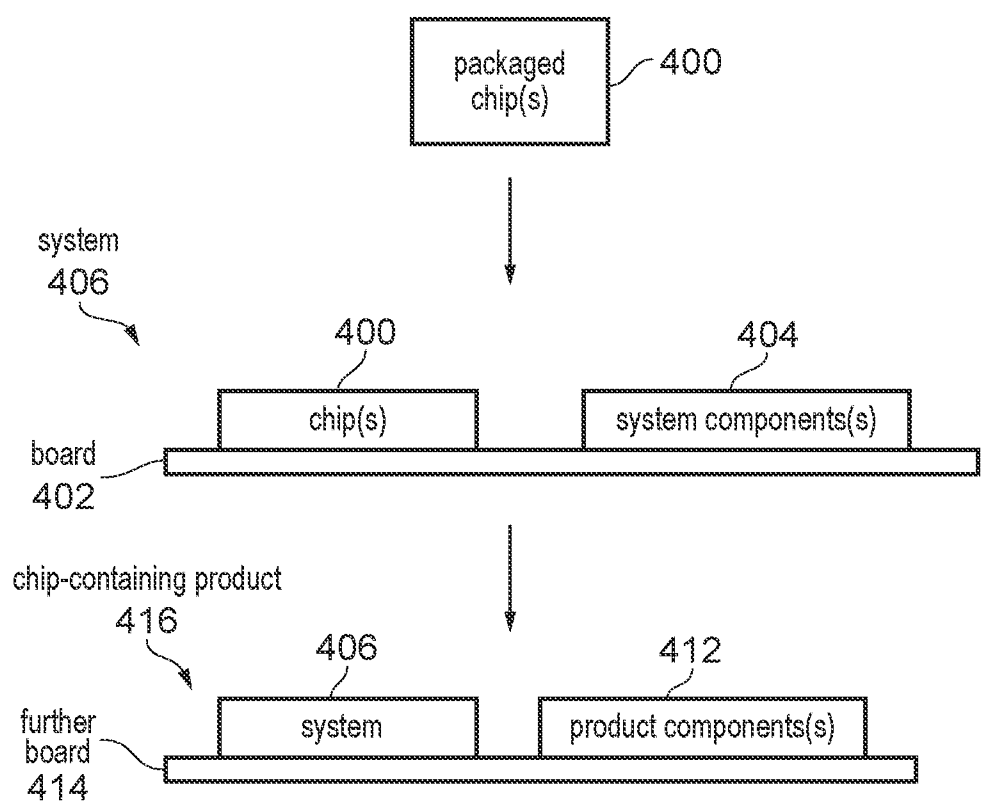
FIG. 9 schematically illustrates a system and a chip containing product according to some configurations of the present techniques.

As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, a system, a chip containing product, a method, and a medium. The apparatus comprises: a plurality of registers comprising at least one array register having a plurality of array regions. The apparatus comprises processing circuitry to receive issued instructions and to process those instructions. The apparatus is also provided with control circuitry responsive to receipt of an instruction requiring access to two or more array regions: to decompose the instruction into two or more execution parts, each corresponding to one of the two or more array regions; and for each execution part, to delay issuing the execution part until it is predicted that the execution part can be processed hazard free. The control circuitry is capable of issuing the two or more execution parts in different cycles based on when it is predicted that each execution part can be processed hazard free.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:

a plurality of registers configured to store data, the plurality of registers comprising at least one array register comprising a plurality of array regions;

processing circuitry configured to receive issued instructions and to perform processing operations identified in the issued instructions; and control circuitry comprising buffer circuitry to store one or more instructions prior to execution by the processing circuitry, the control circuitry responsive to receipt of an instruction requiring access to two or more array regions of the plurality of array regions:

to decompose the instruction into two or more execution parts, each of the two or more execution parts corresponding to one of the two or more array regions; and for each execution part of the two or more execution parts, to delay issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

Clause 2. The apparatus of clause 1, wherein the array register is a two dimensional array register storing data elements identified by coordinates in a first array direction and a second array direction.

Clause 3. The apparatus of clause 2, wherein the array register is subdivided into array regions in both the first array direction and the second array direction.

Clause 4. The apparatus of clause 3, wherein a number of subdivisions of the array register in the first array direction and a number of subdivisions of the array register in the second array direction are different.

Clause 5. The apparatus of any preceding clause, wherein:

the instruction identifies at least one location range in the array register; and the control circuitry is configured, for each execution part, to predict a delay before the execution part can be processed hazard free by the processing circuitry, the delay comprising at least an expected number of remaining instruction cycles for the processing circuitry to process currently executing instructions specifying locations in the array register that overlap with the at least one location range.

Clause 6. The apparatus of clause 5, wherein:

the control circuitry is configured to store an indication of a number of pending instruction cycles required to process each execution part; and the delay comprises at least the sum of the expected number of remaining instruction cycles and the number of pending instruction cycles required to process prior execution parts stored in the buffer circuitry specifying locations in the array register that overlap with the at least one location range.

Clause 7. The apparatus of clause 5 or clause 6, wherein:

the control circuitry is configured to determine unrequired array regions of the array register having no overlap with the at least one location range, and to omit generation of the execution parts corresponding to the unrequired array regions.

Clause 8. The apparatus of any of clauses 5 to 7, wherein:

the control circuitry is configured to maintain a plurality of delay counters, the plurality of delay counters indicative of the delay for one of the two or more execution parts; and each of the plurality of delay counters are responsive to a determination that the expected number of remaining instruction cycles is less than zero, to maintain a negative count of the expected number of remaining instruction cycles.

Clause 9. The apparatus of any of clauses 5 to 8, wherein the delay comprises a predicted array region specific delay for the one of the two or more array regions corresponding to the execution part.

Clause 10. The apparatus of clause 9, wherein:

the processing circuitry is configured to issue feedback information indicative of a number of instruction cycles between receipt of the issued instruction and an instruction cycle at which the issued instruction could be executed hazard free; and the control circuitry is configured to adjust the predicted array region specific delay based on the feedback information.

Clause 11. The apparatus of clause 10, wherein the processing circuitry is responsive to an identification that the issued instruction could have been executed hazard free earlier than it was received, to issue the feedback information to request a reduction of the delay.

Clause 12. The apparatus of clause 10 or clause 11, wherein the processing circuitry is responsive to an identification that the issued instruction was received too early to be immediately executed hazard free, to stall the issued instruction and to issue the feedback information to request an increase of the delay.

Clause 13. The apparatus of clause 11, wherein:

the request for the increase of the delay comprises stall information indicative of a number of stall cycles by which the issued instruction was stalled;

the control circuitry is responsive to the stall information indicating that the number of stall cycles is below a predefined threshold, to determine whether to adjust the predicted array region specific delay based on a global congestion metric; and the control circuitry is responsive to the stall information indicating that the number of stall cycles exceeds the predefined threshold, to adjust the predicted array region specific delay independent of the global congestion metric.

Clause 14. The apparatus of any preceding clause, wherein the processing circuitry is arranged as a processing array divided into a plurality of processing regions each arranged to perform the processing operations for a corresponding array region of the plurality of array regions.

Clause 15. The apparatus of any preceding clause, wherein the processing circuitry is capable of executing different instructions in different ones of the plurality of array regions at a same time.

Clause 16. The apparatus of any preceding clause, wherein when storing the instruction in the buffer circuitry would cause the buffer to overflow, the control circuitry is responsive to the instruction to signal a stall to frontend circuitry providing instructions to the control circuitry.

Clause 17. A system comprising:

the apparatus of any preceding clause, implemented in at least one packaged chip;

at least one system component; and a board, wherein the at least one packaged chip and the at least one system component are assembled on the board.

Clause 18. A chip-containing product comprising the system of clause 17 assembled on a further board with at least one other product component.

Clause 19. A method comprising:

storing data in a plurality of registers, the plurality of registers comprising at least one array register comprising a plurality of array regions;

with processing circuitry, receiving issued instructions and performing processing operations identified in the issued instructions;

storing one or more instructions in buffer circuitry prior to execution by the processing circuitry; and with control circuitry, in response to receipt of an instruction requiring access to two or more array regions of the plurality of array regions:

decomposing the instruction into two or more execution parts, each of the two or more execution parts corresponding to one of the two or more array regions;

for each execution part of the two or more execution parts, delaying issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

Clause 20. A non-transitory computer-readable medium to store computer-readable code for fabrication of the apparatus of any of clauses 1 to 18.

We claim:

1. An apparatus comprising:

a plurality of registers configured to store data, the plurality of registers comprising at least one array register comprising a plurality of array regions;

processing circuitry configured to receive issued instructions and to perform processing operations identified in the issued instructions; and control circuitry comprising buffer circuitry to store one or more instructions prior to execution by the processing circuitry, the control circuitry responsive to receipt of an instruction requiring access to two or more array regions of the plurality of array regions:

to decompose the instruction into two or more execution parts, each of the two or more execution parts corresponding to one of the two or more array regions; and for each execution part of the two or more execution parts, to delay issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

2. The apparatus of claim 1, wherein the array register is a two dimensional array register storing data elements identified by coordinates in a first array direction and a second array direction.

3. The apparatus of claim 2, wherein the array register is subdivided into array regions in both the first array direction and the second array direction.

4. The apparatus of claim 3, wherein a number of subdivisions of the array register in the first array direction and a number of subdivisions of the array register in the second array direction are different.

5. The apparatus of claim 1, wherein:

the instruction identifies at least one location range in the array register; and the control circuitry is configured, for each execution part, to predict a delay before the execution part can be processed hazard free by the processing circuitry, the delay comprising at least an expected number of remaining instruction cycles for the processing circuitry to process currently executing instructions specifying locations in the array register that overlap with the at least one location range.

6. The apparatus of claim 5, wherein:

the control circuitry is configured to store an indication of a number of pending instruction cycles required to process each execution part; and the delay comprises at least the sum of the expected number of remaining instruction cycles and the number of pending instruction cycles required to process prior execution parts stored in the buffer circuitry specifying locations in the array register that overlap with the at least one location range.

7. The apparatus of claim 5, wherein:

the control circuitry is configured to determine unrequired array regions of the array register having no overlap with the at least one location range, and to omit generation of the execution parts corresponding to the unrequired array regions.

8. The apparatus of claim 5, wherein:

the control circuitry is configured to maintain a plurality of delay counters, the plurality of delay counters indicative of the delay for one of the two or more execution parts; and each of the plurality of delay counters are responsive to a determination that the expected number of remaining instruction cycles is less than zero, to maintain a negative count of the expected number of remaining instruction cycles.

9. The apparatus of claim 5, wherein the delay comprises a predicted array region specific delay for the one of the two or more array regions corresponding to the execution part.

10. The apparatus of claim 9, wherein:

the processing circuitry is configured to issue feedback information indicative of a number of instruction cycles between receipt of the issued instruction and an instruction cycle at which the issued instruction could be executed hazard free; and the control circuitry is configured to adjust the predicted array region specific delay based on the feedback information.

11. The apparatus of claim 10, wherein the processing circuitry is responsive to an identification that the issued instruction could have been executed hazard free earlier than it was received, to issue the feedback information to request a reduction of the delay.

12. The apparatus of claim 11, wherein:

the request for the increase of the delay comprises stall information indicative of a number of stall cycles by which the issued instruction was stalled;

the control circuitry is responsive to the stall information indicating that the number of stall cycles is below a predefined threshold, to determine whether to adjust the predicted array region specific delay based on a global congestion metric; and the control circuitry is responsive to the stall information indicating that the number of stall cycles exceeds the predefined threshold, to adjust the predicted array region specific delay independent of the global congestion metric.

13. The apparatus of claim 10, wherein the processing circuitry is responsive to an identification that the issued instruction was received too early to be immediately executed hazard free, to stall the issued instruction and to issue the feedback information to request an increase of the delay.

14. The apparatus of claim 1, wherein the processing circuitry is arranged as a processing array divided into a plurality of processing regions each arranged to perform the processing operations for a corresponding array region of the plurality of array regions.

15. The apparatus of claim 1, wherein the processing circuitry is capable of executing different instructions in different ones of the plurality of array regions at a same time.

16. The apparatus of claim 1, wherein when storing the instruction in the buffer circuitry would cause the buffer to overflow, the control circuitry is responsive to the instruction to signal a stall to frontend circuitry providing instructions to the control circuitry.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A method comprising:

storing data in a plurality of registers, the plurality of registers comprising at least one array register comprising a plurality of array regions;

with processing circuitry, receiving issued instructions and performing processing operations identified in the issued instructions;

storing one or more instructions in buffer circuitry prior to execution by the processing circuitry; and with control circuitry, in response to receipt of an instruction requiring access to two or more array regions of the plurality of array regions:

decomposing the instruction into two or more execution parts, each of the two or more execution parts corresponding to one of the two or more array regions;

for each execution part of the two or more execution parts, delaying issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

20. A non-transitory computer-readable medium to store computer-readable code for fabrication of an apparatus comprising:

a plurality of registers configured to store data, the plurality of registers comprising at least one array register comprising a plurality of array regions;

processing circuitry configured to receive issued instructions and to perform processing operations identified in the issued instructions; and control circuitry comprising buffer circuitry to store one or more instructions prior to execution by the processing circuitry, the control circuitry responsive to receipt of an instruction requiring access to two or more array regions of the plurality of array regions:

to decompose the instruction into two or more execution parts, each of the two or more execution parts corresponding to one of the two or more array regions; and for each execution part of the two or more execution parts, to delay issuing the execution part as one of the issued instructions until it is predicted that the execution part can be processed hazard free by the processing circuitry, wherein the control circuitry is capable of issuing the two or more execution parts of the instruction in different cycles selected based on when it is predicted that each of the two or more execution parts can be processed hazard free.

* * * * *